US008742887B2

(12) United States Patent
Whillock et al.

(10) Patent No.: US 8,742,887 B2
(45) Date of Patent: Jun. 3, 2014

(54) BIOMETRIC VISITOR CHECK SYSTEM

(75) Inventors: Rand Whillock, North Oaks, MN (US); Isaac Cohen, Minnetonka, MN (US); Daniel Blitz, Gaithersburg, MD (US); Vince Jacobson, Eden Prairie, MN (US)

(73) Assignee: Honeywell International Inc., Morristown, NJ (US)

( * ) Notice: Subject to any disclaimer, the term of this patent is extended or adjusted under 35 U.S.C. 154(b) by 733 days.

(21) Appl. No.: 12/875,372

(22) Filed: Sep. 3, 2010

(65) Prior Publication Data

US 2012/0056714 A1 Mar. 8, 2012

(51) Int. Cl.

*G05B 19/00* (2006.01)
*G06K 9/00* (2006.01)

(52) U.S. Cl.

USPC ......... 340/5.2; 340/5.21; 340/5.52; 340/5.82; 382/115; 382/118

(58) Field of Classification Search

None

See application file for complete search history.

(56) References Cited

U.S. PATENT DOCUMENTS

| | | | |
|---|---|---|---|
| 4,641,349 | A | 2/1987 | Flom et al. |
| 4,836,670 | A | 6/1989 | Hutchinson |
| 5,231,674 | A | 7/1993 | Cleveland et al. |
| 5,291,560 | A | 3/1994 | Daugman |
| 5,293,427 | A | 3/1994 | Ueno et al. |
| 5,359,382 | A | 10/1994 | Uenaka |
| 5,404,013 | A | 4/1995 | Tajima |
| 5,543,887 | A | 8/1996 | Akashi |
| 5,551,027 | A | 8/1996 | Choy et al. |
| 5,572,596 | A | 11/1996 | Wildes et al. |
| 5,608,472 | A | 3/1997 | Szirth et al. |
| 5,664,239 | A | 9/1997 | Nakata |
| 5,671,447 | A | 9/1997 | Tokunaga |
| 5,687,031 | A | 11/1997 | Ishihara |
| 5,717,512 | A | 2/1998 | Chmielewski, Jr. et al. |
| 5,751,836 | A | 5/1998 | Wildes et al. |
| 5,859,686 | A | 1/1999 | Aboutalib et al. |

(Continued)

FOREIGN PATENT DOCUMENTS

| | | |
|---|---|---|
| EP | 0484076 | 5/1992 |
| EP | 0593386 | 4/1994 |

(Continued)

OTHER PUBLICATIONS

Avcibas et al., "Steganalysis Using Image Quality Metrics," IEEE Transactions on Image Processing, vol. 12, No. 2, pp. 221-229, Feb. 2003.

(Continued)

*Primary Examiner* — George Bugg
*Assistant Examiner* — Renee Dorsey
(74) *Attorney, Agent, or Firm* — Seager Tufte Wickhem LLC

(57) ABSTRACT

A system for biometric exclusion of certain individuals from entering a facility. A biometric exclusion system may use biometric acquisition and matching and a database to screen a large population of subjects by looking for individuals enrolled in a database. A screening approach may be used to match biometrics having sufficient quality of any individuals attempting to enter the facility, relative to biometrics of individuals stored in the database. A biometric, such as that of a face or an iris, of an individual may be obtained with the individual's knowledge or cooperation. The database may have biographical information pertinent to an individual having a biometric in the database. There may be an associated system which may be used to enroll individuals by entering their biometrics in the database.

12 Claims, 3 Drawing Sheets

(56) References Cited

U.S. PATENT DOCUMENTS

| | | | | |
|---|---|---|---|---|
| 5,860,032 | A | 1/1999 | Iwane | |
| 5,896,174 | A | 4/1999 | Nakata | |
| 5,901,238 | A | 5/1999 | Matsuhita | |
| 5,909,269 | A | 6/1999 | Isogai et al. | |
| 5,953,440 | A | 9/1999 | Zhang et al. | |
| 5,956,122 | A | 9/1999 | Doster | |
| 5,978,494 | A | 11/1999 | Zhang | |
| 5,991,429 | A | 11/1999 | Coffin et al. | |
| 6,005,704 | A | 12/1999 | Chmielewski, Jr. et al. | |
| 6,007,202 | A | 12/1999 | Apple et al. | |
| 6,012,376 | A | 1/2000 | Hanke et al. | |
| 6,021,210 | A | 2/2000 | Camus et al. | |
| 6,028,949 | A | 2/2000 | McKendall | |
| 6,055,322 | A | 4/2000 | Salganicoff et al. | |
| 6,064,752 | A | 5/2000 | Rozmus et al. | |
| 6,069,967 | A | 5/2000 | Rozmus et al. | |
| 6,081,607 | A | 6/2000 | Mori et al. | |
| 6,088,470 | A | 7/2000 | Camus et al. | |
| 6,091,899 | A | 7/2000 | Konishi et al. | |
| 6,101,477 | A | 8/2000 | Hohle et al. | |
| 6,104,431 | A | 8/2000 | Inoue et al. | |
| 6,108,636 | A | 8/2000 | Yap et al. | |
| 6,119,096 | A | 9/2000 | Mann et al. | |
| 6,120,461 | A | 9/2000 | Smyth | |
| 6,134,339 | A | 10/2000 | Luo | |
| 6,144,754 | A | 11/2000 | Okano et al. | |
| 6,246,751 | B1 | 6/2001 | Bergl et al. | |
| 6,247,813 | B1 | 6/2001 | Kim et al. | |
| 6,252,977 | B1 | 6/2001 | Salganicoff et al. | |
| 6,259,478 | B1 | 7/2001 | Hori | |
| 6,282,475 | B1 | 8/2001 | Washington | |
| 6,285,505 | B1 | 9/2001 | Melville et al. | |
| 6,285,780 | B1 | 9/2001 | Yamakita et al. | |
| 6,289,113 | B1 | 9/2001 | McHugh et al. | |
| 6,299,306 | B1 | 10/2001 | Braithwaite et al. | |
| 6,308,015 | B1 | 10/2001 | Matsumoto | |
| 6,309,069 | B1 | 10/2001 | Seal et al. | |
| 6,320,610 | B1 | 11/2001 | Van Sant et al. | |
| 6,320,612 | B1 | 11/2001 | Young | |
| 6,320,973 | B2 | 11/2001 | Suzaki et al. | |
| 6,323,761 | B1 | 11/2001 | Son | |
| 6,325,765 | B1 | 12/2001 | Hay et al. | |
| 6,330,674 | B1 | 12/2001 | Angelo et al. | |
| 6,332,193 | B1 | 12/2001 | Glass et al. | |
| 6,344,683 | B1 | 2/2002 | Kim | |
| 6,370,260 | B1 | 4/2002 | Pavlidis et al. | |
| 6,377,699 | B1 | 4/2002 | Musgrave et al. | |
| 6,393,136 | B1 | 5/2002 | Amir et al. | |
| 6,400,835 | B1 | 6/2002 | Lemelson et al. | |
| 6,421,943 | B1 * | 7/2002 | Caulfield et al. | 42/70.11 |
| 6,424,727 | B1 | 7/2002 | Musgrave et al. | |
| 6,424,845 | B1 | 7/2002 | Emmoft et al. | |
| 6,433,818 | B1 | 8/2002 | Steinberg et al. | |
| 6,438,752 | B1 | 8/2002 | McClard | |
| 6,441,482 | B1 | 8/2002 | Foster | |
| 6,446,045 | B1 | 9/2002 | Stone et al. | |
| 6,483,930 | B1 | 11/2002 | Musgrave et al. | |
| 6,484,936 | B1 | 11/2002 | Nicoll et al. | |
| 6,490,443 | B1 | 12/2002 | Freeny, Jr. | |
| 6,493,669 | B1 | 12/2002 | Curry et al. | |
| 6,494,363 | B1 | 12/2002 | Roger et al. | |
| 6,503,163 | B1 | 1/2003 | Van Sant et al. | |
| 6,505,193 | B1 | 1/2003 | Musgrave et al. | |
| 6,506,078 | B1 | 1/2003 | Mori et al. | |
| 6,508,397 | B1 | 1/2003 | Do | |
| 6,516,078 | B1 | 2/2003 | Yang et al. | |
| 6,516,087 | B1 | 2/2003 | Camus | |
| 6,516,416 | B2 | 2/2003 | Gregg et al. | |
| 6,522,772 | B1 | 2/2003 | Morrison et al. | |
| 6,523,165 | B2 | 2/2003 | Liu et al. | |
| 6,526,160 | B1 | 2/2003 | Ito | |
| 6,532,298 | B1 | 3/2003 | Cambier et al. | |
| 6,540,392 | B1 | 4/2003 | Braithwaite | |
| 6,542,624 | B1 | 4/2003 | Oda | |
| 6,546,121 | B1 | 4/2003 | Oda | |
| 6,553,494 | B1 | 4/2003 | Glass | |
| 6,580,356 | B1 | 6/2003 | Alt et al. | |
| 6,591,001 | B1 | 7/2003 | Oda et al. | |
| 6,591,064 | B2 | 7/2003 | Higashiyama et al. | |
| 6,594,377 | B1 | 7/2003 | Kim et al. | |
| 6,594,399 | B1 | 7/2003 | Camus et al. | |
| 6,598,971 | B2 | 7/2003 | Cleveland | |
| 6,600,878 | B2 | 7/2003 | Pregara | |
| 6,614,919 | B1 | 9/2003 | Suzaki et al. | |
| 6,652,099 | B2 | 11/2003 | Chae et al. | |
| 6,674,367 | B2 | 1/2004 | Sweatte | |
| 6,687,389 | B2 | 2/2004 | McCartney et al. | |
| 6,690,997 | B2 | 2/2004 | Rivalto | |
| 6,708,176 | B2 | 3/2004 | Strunk et al. | |
| 6,709,734 | B2 | 3/2004 | Higashi et al. | |
| 6,711,562 | B1 | 3/2004 | Ross et al. | |
| 6,714,665 | B1 | 3/2004 | Hanna et al. | |
| 6,718,049 | B2 | 4/2004 | Pavlidis et al. | |
| 6,718,050 | B1 | 4/2004 | Yamamoto | |
| 6,718,665 | B2 | 4/2004 | Hess et al. | |
| 6,732,278 | B2 | 5/2004 | Baird, III et al. | |
| 6,734,783 | B1 | 5/2004 | Anbai | |
| 6,745,520 | B2 | 6/2004 | Puskaric et al. | |
| 6,750,435 | B2 | 6/2004 | Ford | |
| 6,751,733 | B1 | 6/2004 | Nakamura et al. | |
| 6,753,919 | B1 | 6/2004 | Daugman | |
| 6,754,640 | B2 | 6/2004 | Bozeman | |
| 6,760,467 | B1 | 7/2004 | Min et al. | |
| 6,765,470 | B2 | 7/2004 | Shinzaki | |
| 6,766,041 | B2 | 7/2004 | Golden et al. | |
| 6,775,774 | B1 | 8/2004 | Harper | |
| 6,785,406 | B1 | 8/2004 | Kamada | |
| 6,792,134 | B2 | 9/2004 | Chen et al. | |
| 6,793,134 | B2 | 9/2004 | Clark | |
| 6,819,219 | B1 | 11/2004 | Bolle et al. | |
| 6,829,370 | B1 | 12/2004 | Pavlidis et al. | |
| 6,832,044 | B2 | 12/2004 | Doi et al. | |
| 6,836,554 | B1 | 12/2004 | Bolle et al. | |
| 6,837,436 | B2 | 1/2005 | Swartz et al. | |
| 6,845,879 | B2 | 1/2005 | Park | |
| 6,853,444 | B2 | 2/2005 | Haddad | |
| 6,867,683 | B2 | 3/2005 | Calvesio et al. | |
| 6,873,960 | B1 | 3/2005 | Wood et al. | |
| 6,896,187 | B2 | 5/2005 | Stockhammer | |
| 6,905,411 | B2 | 6/2005 | Nguyen et al. | |
| 6,920,237 | B2 | 7/2005 | Chen et al. | |
| 6,930,707 | B2 | 8/2005 | Bates et al. | |
| 6,934,849 | B2 | 8/2005 | Kramer et al. | |
| 6,950,139 | B2 | 9/2005 | Fujinawa | |
| 6,954,738 | B2 | 10/2005 | Wang et al. | |
| 6,957,341 | B2 | 10/2005 | Rice et al. | |
| 6,964,666 | B2 | 11/2005 | Jackson | |
| 6,968,457 | B2 | 11/2005 | Tam | |
| 6,972,797 | B2 | 12/2005 | Izumi | |
| 6,992,562 | B2 | 1/2006 | Fuks et al. | |
| 6,992,717 | B2 | 1/2006 | Hatano | |
| 7,003,669 | B2 | 2/2006 | Monk | |
| 7,017,359 | B2 | 3/2006 | Kim et al. | |
| 7,030,351 | B2 | 4/2006 | Wasserman et al. | |
| 7,031,539 | B2 | 4/2006 | Tisse et al. | |
| 7,043,056 | B2 | 5/2006 | Edwards et al. | |
| 7,053,948 | B2 | 5/2006 | Konishi | |
| 7,058,209 | B2 | 6/2006 | Chen et al. | |
| 7,071,971 | B2 | 7/2006 | Elberbaum | |
| 7,076,087 | B2 | 7/2006 | Wakiyama | |
| 7,084,904 | B2 | 8/2006 | Liu et al. | |
| 7,092,555 | B2 | 8/2006 | Lee et al. | |
| 7,095,901 | B2 | 8/2006 | Lee et al. | |
| 7,100,818 | B2 | 9/2006 | Swaine | |
| 7,113,170 | B2 | 9/2006 | Lauper et al. | |
| 7,114,080 | B2 | 9/2006 | Rahman et al. | |
| 7,120,607 | B2 | 10/2006 | Bolle et al. | |
| 7,125,335 | B2 | 10/2006 | Rowe | |
| 7,130,452 | B2 | 10/2006 | Bolle et al. | |
| 7,130,453 | B2 | 10/2006 | Kondo et al. | |
| 7,135,980 | B2 | 11/2006 | Moore et al. | |
| 7,136,581 | B2 | 11/2006 | Fujii | |
| 7,145,457 | B2 | 12/2006 | Spitz et al. | |
| 7,146,027 | B2 | 12/2006 | Kim et al. | |

(56) References Cited

U.S. PATENT DOCUMENTS

| | | | |
|---|---|---|---|
| 7,152,085 | B2 | 12/2006 | Tisse |
| 7,155,035 | B2 | 12/2006 | Kondo et al. |
| 7,169,052 | B2 | 1/2007 | Beaulieu |
| 7,173,348 | B2 | 2/2007 | Voda et al. |
| 7,174,036 | B2 | 2/2007 | Ohba |
| 7,177,449 | B2 | 2/2007 | Russon et al. |
| 7,181,049 | B2 | 2/2007 | Ike |
| 7,183,895 | B2 | 2/2007 | Bazakos et al. |
| 7,184,577 | B2 | 2/2007 | Chen et al. |
| 7,187,786 | B2 | 3/2007 | Kee |
| 7,191,936 | B2 | 3/2007 | Smith et al. |
| 7,197,166 | B2 | 3/2007 | Jeng |
| 7,197,173 | B2 | 3/2007 | Jones et al. |
| 7,203,343 | B2 | 4/2007 | Manasse et al. |
| 7,204,425 | B2 | 4/2007 | Mosher, Jr. et al. |
| 7,206,431 | B2 | 4/2007 | Schuessler |
| 7,215,797 | B2 | 5/2007 | Park |
| 7,226,164 | B2 | 6/2007 | Abourizk et al. |
| 7,239,726 | B2 | 7/2007 | Li |
| 7,269,737 | B2 | 9/2007 | Robinson |
| 7,271,839 | B2 | 9/2007 | Lee et al. |
| 7,272,380 | B2 | 9/2007 | Lee et al. |
| 7,272,385 | B2 | 9/2007 | Mirouze et al. |
| 7,277,561 | B2 | 10/2007 | Shin |
| 7,277,891 | B2 | 10/2007 | Howard et al. |
| 7,280,984 | B2 | 10/2007 | Phelan, III et al. |
| 7,287,021 | B2 | 10/2007 | De Smet |
| 7,298,873 | B2 | 11/2007 | Miller, Jr. et al. |
| 7,298,874 | B2 | 11/2007 | Cho |
| 7,305,089 | B2 | 12/2007 | Morikawa et al. |
| 7,309,126 | B2 | 12/2007 | Mihashi et al. |
| 7,312,818 | B2 | 12/2007 | Ooi et al. |
| 7,313,529 | B2 | 12/2007 | Thompson |
| 7,315,233 | B2 | 1/2008 | Yuhara |
| 7,331,667 | B2 | 2/2008 | Grotehusmann et al. |
| 7,333,637 | B2 | 2/2008 | Walfridsson |
| 7,333,798 | B2 | 2/2008 | Hodge |
| 7,336,806 | B2 | 2/2008 | Schonberg et al. |
| 7,338,167 | B2 | 3/2008 | Zelvin et al. |
| 7,346,195 | B2 | 3/2008 | Lauper et al. |
| 7,346,779 | B2 | 3/2008 | Leeper |
| 7,353,399 | B2 | 4/2008 | Ooi et al. |
| 7,362,210 | B2 | 4/2008 | Bazakos et al. |
| 7,362,370 | B2 | 4/2008 | Sakamoto et al. |
| 7,362,884 | B2 | 4/2008 | Willis et al. |
| 7,365,771 | B2 | 4/2008 | Kahn et al. |
| 7,380,938 | B2 | 6/2008 | Chmielewski, Jr. et al. |
| 7,391,865 | B2 | 6/2008 | Orsini et al. |
| 7,404,086 | B2 | 7/2008 | Sands et al. |
| 7,406,184 | B2 | 7/2008 | Wolff et al. |
| 7,414,648 | B2 | 8/2008 | Imada |
| 7,417,682 | B2 | 8/2008 | Kuwakino et al. |
| 7,418,115 | B2 | 8/2008 | Northcott et al. |
| 7,421,097 | B2 | 9/2008 | Hamza et al. |
| 7,436,986 | B2 | 10/2008 | Caldwell |
| 7,443,441 | B2 | 10/2008 | Hiraoka |
| 7,447,911 | B2 | 11/2008 | Chou et al. |
| 7,460,693 | B2 | 12/2008 | Loy et al. |
| 7,466,348 | B2 | 12/2008 | Morikawa et al. |
| 7,467,809 | B2 | 12/2008 | Breed et al. |
| 7,471,451 | B2 | 12/2008 | Dent et al. |
| 7,472,283 | B2 | 12/2008 | Angelo et al. |
| 7,486,806 | B2 | 2/2009 | Azuma et al. |
| 7,506,172 | B2 | 3/2009 | Bhakta |
| 7,512,254 | B2 | 3/2009 | Volkommer et al. |
| 7,518,651 | B2 | 4/2009 | Butterworth |
| 7,537,568 | B2 | 5/2009 | Moehring |
| 7,538,326 | B2 | 5/2009 | Johnson et al. |
| 7,542,945 | B2 | 6/2009 | Thompson et al. |
| 7,552,333 | B2 | 6/2009 | Wheeler et al. |
| 7,580,620 | B2 | 8/2009 | Raskar et al. |
| 7,593,550 | B2 | 9/2009 | Hamza |
| 7,639,846 | B2 | 12/2009 | Yoda |
| 7,722,461 | B2 | 5/2010 | Gatto et al. |
| 7,751,598 | B2 | 7/2010 | Matey et al. |
| 7,756,301 | B2 | 7/2010 | Hamza |
| 7,756,407 | B2 | 7/2010 | Raskar |
| 7,761,453 | B2 | 7/2010 | Hamza |
| 7,777,802 | B2 | 8/2010 | Shinohara et al. |
| 7,804,982 | B2 | 9/2010 | Howard et al. |
| 2001/0026632 | A1 | 10/2001 | Tamai |
| 2001/0027116 | A1 | 10/2001 | Baird |
| 2001/0047479 | A1 | 11/2001 | Bromba et al. |
| 2001/0051924 | A1 | 12/2001 | Uberti |
| 2002/0010857 | A1 | 1/2002 | Karthik |
| 2002/0039433 | A1 | 4/2002 | Shin |
| 2002/0040434 | A1 | 4/2002 | Elliston et al. |
| 2002/0062280 | A1 | 5/2002 | Zachariassen et al. |
| 2002/0067259 | A1* | 6/2002 | Fufidio et al. ................. 340/541 |
| 2002/0112177 | A1 | 8/2002 | Voltmer et al. |
| 2002/0142844 | A1 | 10/2002 | Kerr |
| 2002/0150281 | A1 | 10/2002 | Cho |
| 2002/0154794 | A1 | 10/2002 | Cho |
| 2002/0158750 | A1 | 10/2002 | Almalik |
| 2002/0175182 | A1 | 11/2002 | Matthews |
| 2002/0186131 | A1 | 12/2002 | Fettis |
| 2002/0191075 | A1 | 12/2002 | Doi et al. |
| 2002/0191076 | A1 | 12/2002 | Wada et al. |
| 2002/0194128 | A1 | 12/2002 | Maritzen et al. |
| 2002/0194131 | A1 | 12/2002 | Dick |
| 2002/0198731 | A1 | 12/2002 | Barnes et al. |
| 2003/0002714 | A1 | 1/2003 | Wakiyama |
| 2003/0012413 | A1 | 1/2003 | Kusakari et al. |
| 2003/0038173 | A1 | 2/2003 | Blackson et al. |
| 2003/0046228 | A1 | 3/2003 | Berney |
| 2003/0055689 | A1 | 3/2003 | Block et al. |
| 2003/0055787 | A1 | 3/2003 | Fujii |
| 2003/0065626 | A1 | 4/2003 | Allen |
| 2003/0071743 | A1 | 4/2003 | Seah et al. |
| 2003/0072475 | A1 | 4/2003 | Tamori |
| 2003/0073499 | A1 | 4/2003 | Reece |
| 2003/0074317 | A1 | 4/2003 | Hofi |
| 2003/0074326 | A1 | 4/2003 | Byers |
| 2003/0080194 | A1 | 5/2003 | O'Hara et al. |
| 2003/0092489 | A1 | 5/2003 | Veradej |
| 2003/0098776 | A1 | 5/2003 | Friedli |
| 2003/0099379 | A1* | 5/2003 | Monk et al. .................. 382/115 |
| 2003/0107097 | A1 | 6/2003 | McArthur et al. |
| 2003/0107645 | A1 | 6/2003 | Yoon |
| 2003/0115148 | A1 | 6/2003 | Takhar |
| 2003/0116630 | A1 | 6/2003 | Carey et al. |
| 2003/0118212 | A1 | 6/2003 | Min et al. |
| 2003/0125054 | A1 | 7/2003 | Garcia |
| 2003/0125057 | A1 | 7/2003 | Pesola |
| 2003/0126560 | A1 | 7/2003 | Kurapati et al. |
| 2003/0131245 | A1 | 7/2003 | Linderman |
| 2003/0133597 | A1 | 7/2003 | Moore et al. |
| 2003/0140235 | A1 | 7/2003 | Immega et al. |
| 2003/0140928 | A1 | 7/2003 | Bui et al. |
| 2003/0141411 | A1 | 7/2003 | Pandya et al. |
| 2003/0149881 | A1 | 8/2003 | Patel et al. |
| 2003/0152251 | A1 | 8/2003 | Ike |
| 2003/0156741 | A1 | 8/2003 | Lee et al. |
| 2003/0158762 | A1 | 8/2003 | Wu |
| 2003/0158821 | A1 | 8/2003 | Maia |
| 2003/0159051 | A1 | 8/2003 | Hollnagel |
| 2003/0163739 | A1 | 8/2003 | Armington et al. |
| 2003/0169334 | A1 | 9/2003 | Braithwaite et al. |
| 2003/0174049 | A1 | 9/2003 | Beigel et al. |
| 2003/0177051 | A1 | 9/2003 | Driscoll et al. |
| 2003/0182151 | A1 | 9/2003 | Taslitz |
| 2003/0182182 | A1 | 9/2003 | Kocher |
| 2003/0189480 | A1 | 10/2003 | Hamid |
| 2003/0189481 | A1 | 10/2003 | Hamid |
| 2003/0191949 | A1 | 10/2003 | Odagawa |
| 2003/0194112 | A1 | 10/2003 | Lee |
| 2003/0210139 | A1 | 11/2003 | Brooks et al. |
| 2003/0225711 | A1 | 12/2003 | Paping |
| 2003/0236120 | A1 | 12/2003 | Reece et al. |
| 2004/0002894 | A1 | 1/2004 | Kocher |
| 2004/0005078 | A1 | 1/2004 | Tillotson |
| 2004/0006553 | A1 | 1/2004 | de Vries et al. |
| 2004/0010462 | A1 | 1/2004 | Moon et al. |
| 2004/0025030 | A1 | 2/2004 | Corbett-Clark et al. |

(56) References Cited

U.S. PATENT DOCUMENTS

| | | | | |
|---|---|---|---|---|
| 2004/0025053 | A1 | 2/2004 | Hayward | |
| 2004/0030930 | A1 | 2/2004 | Nomura | |
| 2004/0037450 | A1 | 2/2004 | Bradski | |
| 2004/0039914 | A1 | 2/2004 | Barr et al. | |
| 2004/0042641 | A1 | 3/2004 | Jakubowski | |
| 2004/0044627 | A1 | 3/2004 | Russell et al. | |
| 2004/0046640 | A1 | 3/2004 | Jourdain et al. | |
| 2004/0050924 | A1 | 3/2004 | Mletzko et al. | |
| 2004/0050930 | A1 | 3/2004 | Rowe | |
| 2004/0052405 | A1 | 3/2004 | Walfridsson | |
| 2004/0052418 | A1 | 3/2004 | DeLean | |
| 2004/0059590 | A1 | 3/2004 | Mercredi et al. | |
| 2004/0059953 | A1 | 3/2004 | Purnell | |
| 2004/0117636 | A1 | 6/2004 | Cheng | |
| 2004/0133804 | A1 | 7/2004 | Smith et al. | |
| 2004/0160518 | A1 | 8/2004 | Park | |
| 2004/0162870 | A1 | 8/2004 | Matsuzaki et al. | |
| 2004/0162984 | A1 | 8/2004 | Freeman et al. | |
| 2004/0172541 | A1 | 9/2004 | Ando et al. | |
| 2004/0193893 | A1 | 9/2004 | Braithwaite et al. | |
| 2004/0233038 | A1 | 11/2004 | Beenau et al. | |
| 2004/0252866 | A1 | 12/2004 | Tisse et al. | |
| 2004/0255168 | A1 | 12/2004 | Murashita et al. | |
| 2005/0008201 | A1 | 1/2005 | Lee et al. | |
| 2005/0012817 | A1 | 1/2005 | Hampapur et al. | |
| 2005/0029353 | A1 | 2/2005 | Isemura et al. | |
| 2005/0052566 | A1 | 3/2005 | Kato | |
| 2005/0055582 | A1 | 3/2005 | Bazakos et al. | |
| 2005/0063567 | A1 | 3/2005 | Saitoh et al. | |
| 2005/0084137 | A1 | 4/2005 | Kim et al. | |
| 2005/0084179 | A1 | 4/2005 | Hanna et al. | |
| 2005/0102502 | A1 | 5/2005 | Sagen | |
| 2005/0125258 | A1 | 6/2005 | Yellin et al. | |
| 2005/0129286 | A1 | 6/2005 | Hekimian | |
| 2005/0138385 | A1 | 6/2005 | Friedli et al. | |
| 2005/0138387 | A1 | 6/2005 | Lam et al. | |
| 2005/0146640 | A1 | 7/2005 | Shibata | |
| 2005/0151620 | A1 | 7/2005 | Neumann | |
| 2005/0152583 | A1 | 7/2005 | Kondo et al. | |
| 2005/0193212 | A1 | 9/2005 | Yuhara | |
| 2005/0199708 | A1 | 9/2005 | Friedman | |
| 2005/0206501 | A1 | 9/2005 | Farhat | |
| 2005/0206502 | A1 | 9/2005 | Bernitz | |
| 2005/0210267 | A1 | 9/2005 | Sugano et al. | |
| 2005/0210270 | A1 | 9/2005 | Rohatgi et al. | |
| 2005/0238214 | A1 | 10/2005 | Matsuda et al. | |
| 2005/0240778 | A1 | 10/2005 | Saito | |
| 2005/0248725 | A1 | 11/2005 | Ikoma et al. | |
| 2005/0249385 | A1 | 11/2005 | Kondo et al. | |
| 2005/0255840 | A1 | 11/2005 | Markham | |
| 2006/0093190 | A1 | 5/2006 | Cheng et al. | |
| 2006/0147094 | A1 | 7/2006 | Yoo | |
| 2006/0165266 | A1 | 7/2006 | Hamza | |
| 2006/0274919 | A1 | 12/2006 | LoIacono et al. | |
| 2007/0036397 | A1 | 2/2007 | Hamza | |
| 2007/0140531 | A1 | 6/2007 | Hamza | |
| 2007/0160266 | A1 | 7/2007 | Jones et al. | |
| 2007/0189582 | A1 | 8/2007 | Hamza et al. | |
| 2007/0206840 | A1 | 9/2007 | Jacobson | |
| 2007/0211924 | A1 | 9/2007 | Hamza | |
| 2007/0243935 | A1* | 10/2007 | Huizinga | 463/42 |
| 2007/0274570 | A1 | 11/2007 | Hamza | |
| 2007/0274571 | A1 | 11/2007 | Hamza | |
| 2007/0286590 | A1 | 12/2007 | Terashima | |
| 2008/0005578 | A1 | 1/2008 | Shafir | |
| 2008/0075334 | A1 | 3/2008 | Determan et al. | |
| 2008/0075441 | A1 | 3/2008 | Jelinek et al. | |
| 2008/0075445 | A1 | 3/2008 | Whillock et al. | |
| 2008/0104415 | A1 | 5/2008 | Palti-Wasserman et al. | |
| 2008/0148030 | A1 | 6/2008 | Goffin | |
| 2008/0211347 | A1 | 9/2008 | Wright et al. | |
| 2008/0252412 | A1 | 10/2008 | Larsson et al. | |
| 2008/0267456 | A1 | 10/2008 | Anderson | |
| 2009/0046899 | A1 | 2/2009 | Northcott et al. | |
| 2009/0092283 | A1* | 4/2009 | Whillock et al. | 382/115 |
| 2009/0316993 | A1 | 12/2009 | Brasnett et al. | |
| 2010/0002913 | A1 | 1/2010 | Hamza | |
| 2010/0033677 | A1 | 2/2010 | Jelinek | |
| 2010/0034529 | A1 | 2/2010 | Jelinek | |
| 2010/0142765 | A1 | 6/2010 | Hamza | |
| 2010/0182440 | A1 | 7/2010 | McCloskey | |
| 2010/0239119 | A1 | 9/2010 | Bazakos et al. | |
| 2011/0320353 | A1* | 12/2011 | Mehew et al. | 705/44 |

FOREIGN PATENT DOCUMENTS

| | | |
|---|---|---|
| EP | 0878780 | 11/1998 |
| EP | 0899680 | 3/1999 |
| EP | 0910986 | 4/1999 |
| EP | 0962894 | 12/1999 |
| EP | 1018297 | 7/2000 |
| EP | 1024463 | 8/2000 |
| EP | 1028398 | 8/2000 |
| EP | 1041506 | 10/2000 |
| EP | 1041523 | 10/2000 |
| EP | 1126403 | 8/2001 |
| EP | 1139270 | 10/2001 |
| EP | 1237117 | 9/2002 |
| EP | 1477925 | 11/2004 |
| EP | 1635307 | 3/2006 |
| GB | 2369205 | 5/2002 |
| GB | 2371396 | 7/2002 |
| GB | 2375913 | 11/2002 |
| GB | 2402840 | 12/2004 |
| GB | 2411980 | 9/2005 |
| JP | 9161135 | 6/1997 |
| JP | 9198545 | 7/1997 |
| JP | 9201348 | 8/1997 |
| JP | 9147233 | 9/1997 |
| JP | 9234264 | 9/1997 |
| JP | 9305765 | 11/1997 |
| JP | 9319927 | 12/1997 |
| JP | 10021392 | 1/1998 |
| JP | 10040386 | 2/1998 |
| JP | 10049728 | 2/1998 |
| JP | 10137219 | 5/1998 |
| JP | 10137221 | 5/1998 |
| JP | 10137222 | 5/1998 |
| JP | 10137223 | 5/1998 |
| JP | 10248827 | 9/1998 |
| JP | 10269183 | 10/1998 |
| JP | 11047117 | 2/1999 |
| JP | 11089820 | 4/1999 |
| JP | 11200684 | 7/1999 |
| JP | 11203478 | 7/1999 |
| JP | 11213047 | 8/1999 |
| JP | 11339037 | 12/1999 |
| JP | 2000005149 | 1/2000 |
| JP | 2000005150 | 1/2000 |
| JP | 2000011163 | 1/2000 |
| JP | 2000023946 | 1/2000 |
| JP | 2000083930 | 3/2000 |
| JP | 2000102510 | 4/2000 |
| JP | 2000102524 | 4/2000 |
| JP | 2000105830 | 4/2000 |
| JP | 2000107156 | 4/2000 |
| JP | 2000139878 | 5/2000 |
| JP | 2000155863 | 6/2000 |
| JP | 2000182050 | 6/2000 |
| JP | 2000185031 | 7/2000 |
| JP | 2000194972 | 7/2000 |
| JP | 2000237167 | 9/2000 |
| JP | 2000242788 | 9/2000 |
| JP | 2000259817 | 9/2000 |
| JP | 2000356059 | 12/2000 |
| JP | 2000357232 | 12/2000 |
| JP | 2001005948 | 1/2001 |
| JP | 2001067399 | 3/2001 |
| JP | 2001101429 | 4/2001 |
| JP | 2001167275 | 6/2001 |
| JP | 2001222661 | 8/2001 |
| JP | 2001292981 | 10/2001 |
| JP | 2001297177 | 10/2001 |
| JP | 2001358987 | 12/2001 |

(56) References Cited

FOREIGN PATENT DOCUMENTS

| | | |
|---|---|---|
| JP | 2002119477 | 4/2002 |
| JP | 2002133415 | 5/2002 |
| JP | 2002153444 | 5/2002 |
| JP | 2002153445 | 5/2002 |
| JP | 2002260071 | 9/2002 |
| JP | 2002271689 | 9/2002 |
| JP | 2002286650 | 10/2002 |
| JP | 2002312772 | 10/2002 |
| JP | 2002329204 | 11/2002 |
| JP | 2003006628 | 1/2003 |
| JP | 2003036434 | 2/2003 |
| JP | 2003108720 | 4/2003 |
| JP | 2003108983 | 4/2003 |
| JP | 2003132355 | 5/2003 |
| JP | 2003150942 | 5/2003 |
| JP | 2003153880 | 5/2003 |
| JP | 2003242125 | 8/2003 |
| JP | 2003271565 | 9/2003 |
| JP | 2003271940 | 9/2003 |
| JP | 2003308522 | 10/2003 |
| JP | 2003308523 | 10/2003 |
| JP | 2003317102 | 11/2003 |
| JP | 2003331265 | 11/2003 |
| JP | 2004005167 | 1/2004 |
| JP | 2004021406 | 1/2004 |
| JP | 2004030334 | 1/2004 |
| JP | 2004038305 | 2/2004 |
| JP | 2004094575 | 3/2004 |
| JP | 2004152046 | 5/2004 |
| JP | 2004163356 | 6/2004 |
| JP | 2004164483 | 6/2004 |
| JP | 2004171350 | 6/2004 |
| JP | 2004171602 | 6/2004 |
| JP | 2004206444 | 7/2004 |
| JP | 2004220376 | 8/2004 |
| JP | 2004261515 | 9/2004 |
| JP | 2004280221 | 10/2004 |
| JP | 2004280547 | 10/2004 |
| JP | 2004287621 | 10/2004 |
| JP | 2004315127 | 11/2004 |
| JP | 2004318248 | 11/2004 |
| JP | 2005004524 | 1/2005 |
| JP | 2005011207 | 1/2005 |
| JP | 2005025577 | 1/2005 |
| JP | 2005038257 | 2/2005 |
| JP | 2005062990 | 3/2005 |
| JP | 2005115961 | 4/2005 |
| JP | 2005148883 | 6/2005 |
| JP | 2005242677 | 9/2005 |
| WO | WO 97/17674 | 5/1997 |
| WO | WO 97/21188 | 6/1997 |
| WO | WO 98/02083 | 1/1998 |
| WO | WO 98/08439 | 3/1998 |
| WO | WO 99/32317 | 7/1999 |
| WO | WO 99/52422 | 10/1999 |
| WO | WO 99/65175 | 12/1999 |
| WO | WO 00/28484 | 5/2000 |
| WO | WO 00/29986 | 5/2000 |
| WO | WO 00/31677 | 6/2000 |
| WO | WO 00/36605 | 6/2000 |
| WO | WO 00/62239 | 10/2000 |
| WO | WO 01/01329 | 1/2001 |
| WO | WO 01/03100 | 1/2001 |
| WO | WO 01/28476 | 4/2001 |
| WO | WO 01/35348 | 5/2001 |
| WO | WO 01/35349 | 5/2001 |
| WO | WO 01/40982 | 6/2001 |
| WO | WO 01/63994 | 8/2001 |
| WO | WO 01/69490 | 9/2001 |
| WO | WO 01/86599 | 11/2001 |
| WO | WO 02/01451 | 1/2002 |
| WO | WO 02/19030 | 3/2002 |
| WO | WO 02/35452 | 5/2002 |
| WO | WO 02/35480 | 5/2002 |
| WO | WO 02/091735 | 11/2002 |
| WO | WO 02/095657 | 11/2002 |
| WO | WO 03/002387 | 1/2003 |
| WO | WO 03/003910 | 1/2003 |
| WO | WO 03/054777 | 7/2003 |
| WO | WO 03/077077 | 9/2003 |
| WO | WO 2004/029863 | 4/2004 |
| WO | WO 2004/042646 | 5/2004 |
| WO | WO 2004/055737 | 7/2004 |
| WO | WO 2004/089214 | 10/2004 |
| WO | WO 2004/097743 | 11/2004 |
| WO | WO 2005/008567 | 1/2005 |
| WO | WO 2005/013181 | 2/2005 |
| WO | WO 2005/024698 | 3/2005 |
| WO | WO 2005/024708 | 3/2005 |
| WO | WO 2005/024709 | 3/2005 |
| WO | WO 2005/029388 | 3/2005 |
| WO | WO 2005/062235 | 7/2005 |
| WO | WO 2005/069252 | 7/2005 |
| WO | WO 2005/093510 | 10/2005 |
| WO | WO 2005/093681 | 10/2005 |
| WO | WO 2005/096962 | 10/2005 |
| WO | WO 2005/098531 | 10/2005 |
| WO | WO 2005/104704 | 11/2005 |
| WO | WO 2005/109344 | 11/2005 |
| WO | WO 2006/012645 | 2/2006 |
| WO | WO 2006/023046 | 3/2006 |
| WO | WO 2006/051462 | 5/2006 |
| WO | WO 2006/063076 | 6/2006 |
| WO | WO 2006/081209 | 8/2006 |
| WO | WO 2006/081505 | 8/2006 |
| WO | WO 2007/101269 | 9/2007 |
| WO | WO 2007/101275 | 9/2007 |
| WO | WO 2007/101276 | 9/2007 |
| WO | WO 2007/103698 | 9/2007 |
| WO | WO 2007/103701 | 9/2007 |
| WO | WO 2007/103833 | 9/2007 |
| WO | WO 2007/103834 | 9/2007 |
| WO | WO 2008/016724 | 2/2008 |
| WO | WO 2008/019168 | 2/2008 |
| WO | WO 2008/019169 | 2/2008 |
| WO | WO 2008/021584 | 2/2008 |
| WO | WO 2008/031089 | 3/2008 |
| WO | WO 2008/040026 | 4/2008 |

OTHER PUBLICATIONS

Boles, "A Security System Based on Human Iris Identification Using Wavelet Transform," IEEE First International Conference on Knowledge-Based Intelligent Electronic Systems, May 21-23, Adelaide, Australia, pp. 533-541, 1997.

Bonney et al., "Iris Pattern Extraction Using Bit Planes and Standard Deviations," IEEE, pp. 582-586, 2004.

Camus et al., "Reliable and Fast Eye Finding in Close-up Images," IEEE, pp. 389-394, 2002.

Carson et al., "Blobworld: Image Segmentation Using Expectation-Maximization and Its Application to Image Querying," IEEE Transactions on Pattern Analysis and Machine Intelligence, vol. 24, No. 8, pp. 1026-1038, Aug. 2002.

Cui et al., "A Fast and Robust Iris Localization Method Based on Texture Segmentation," 8 pages, 2004.

Cui et al., "An Appearance-Based Method for Iris Detection," 6 pages, 2004.

Cui et al., "An Iris Detection Method Based on Structure Information," Advances in Biometric Person Authentication, International Workshop on Biometric Recognition Systems, IWBRS 2005, Beijing China, 10 pages, Oct. 22-23, 2005.

Cui et al., "An Iris Image Synthesis Method Based on PCA and Super-Resolution," IEEE Computer Society, Proceedings of the 17th International Conference on Pattern Recognition, 6 pages, Aug. 23-26, 2004.

Cui et al., "An Iris Recognition Algorithm Using Local Extreme Points," Biometric Authentication, First International Conference, ICBA 2004, Hong Kong, China, 10 pages, Jul. 15-17, 2004.

Daugman, "Results From 200 Billion Iris Cross-Comparisons," University of Cambridge Computer Laboratory, Technical Report, No. 635, 8 pages, Jun. 2005.

(56) References Cited

OTHER PUBLICATIONS

Daugman, "How Iris Recognition Works," IEEE 2002 International Conference on Image Processing, vol. I of III, 6 pages, Sep. 22-25, 2002.
Du et al., "A One-Dimensional Approach for Iris Identification," 11 pages, prior to Jan. 25, 2006.
Guo et al., "A System for Automatic Iris Capturing," Mitsubishi Electric Research Laboratories, Inc., 10 pages, 2005.
Guo, "Face, Expression, and Iris Recognition Using Learning-Based Approaches," 132 pages, 2006.
http://www.newscientisttech.com/article/dn11110-invention-covert-iris-sc, "Invention: Covert Iris Scanner," 3 pages, printed Feb. 8, 2007.
Huang et al., "Iris Model Based on Local Orientation Description," 5 pages, prior to Jan. 25, 2006.
Huang et al., "An Efficient Iris Recognition System," IEEE Proceedings of the First International Conference on Machine Learning and Cybernetics, Beijing, pp. 450-454, Nov. 4-5, 2002.
Jalaja et al., "Texture Element Feature Characterizations for CBIR," IEEE, pp. 733-736, 2005.
Kalka et al., "Image Quality Assessment for Iris Biometric," Proc. of SPIE vol. 6202 62020D, 11 pages, 2006.
Ko et al., "Monitoring and Reporting of Fingerprint Image Quality and Match Accuracy for a Large User Application," IEEE Computer Society, Proceedings of the 33rd Applied Imagery Pattern Recognition Workshop, 6 pages, 2004.
Lau et al., "Finding a Small Number of Regions in an Image Using Low-Level Features," Pattern Recognition 35, pp. 2323-2339, 2002.
Ma et al., "Personal Identification Based on Iris Texture Analysis," IEEE Transactions on Pattern Analysis and Machine Intelligence, vol. 25, No. 12, pp. 1519-1533, Dec. 2003.
Masek, "Recognition of Human Iris Patterns for Biometric Identification," 61 pages, 2003.
Maurer et al., "Tracking and Learning Graphs and Pose on Image Sequences of Faces," IEEE Computer Society Press, International Conference on Automatic Face and Gesture Recognition, pp. 176-181, Oct. 14-16, 1996.
Oppenheim et al, "The Importance of Phase in Signals," Proceedings of the IEEE, vol. 69, No. 5, pp. 529-541, 1981.
Ratha et al., "A Real-Time Matching System for Large Fingerprint Databases," IEEE Transactions on Pattern Analysis, and Machine Intelligence, vol. 18, No. 8, pp. 799-812, Aug. 1996.
Sony, "Network Color Camera, SNC-RZ30N (NTSC)," 6 pages, Aug. 2002.
Sun et al., "Robust Encoding of Local Ordinal Measures: A General Framework of Iris Recognition," 13 pages, prior to Jan. 25, 2006.
Wang et al, "Image Quality Assessment: From Error Visibility to Structural Similarity," IEEE Transactions on Image Processing, vol. 13, No. 4, pp. 600-612, Apr. 2004.
Wang et al., "A Universal Image Quality Index," IEEE Signal Processing Letters, vol. 9, No. 3, pp. 81-84, Mar. 2002.
Wang et al., "Local Phase Coherence and the Perception of Blur," Advances in Nueral Information Processing Systems 16, pp. 1435-1442, 2004.
AOptix Technologies, "Introducing the AOptix InSight 2 Meter Iris Recognition System," 6 pages, 2010.
Belhumeur et al., "Eigenfaces vs. Fisherfaces: Recognition Using Class Specific Linear Projection," 14 pages, prior to Jun. 11, 2010.
Bentley et al., "Multidimensional Binary Search Trees Used for Associative Searching," Communications of the ACM, vol. 18, No. 9, pp. 509-517, Sep. 1975.
Blackman et al., "Chapter 9, Multiple Sensor Tracking: Issues and Methods," Design and Analysis of Modern Tracking Systems, Artech House, pp. 595-659, 1999.
Brasnett et al., "A Robust Visual Identifier Using the Trace Transform," 6 pages, prior to Jun. 11, 2010.
Buades et al., "A Review of Image Denoising Algorithms, with a New One," Multiscale Modeling & Simulation, vol. 4, No. 2, pp. 490-530, 2005.
Chen et al., "Localized Iris Image Quality Using 2-D Wavelets," LNCS vol. 3832, pp. 373-381, 2005.
Chow et al., "Towards a System for Automatic Facial Feature Detection," Pattern Recognition vol. 26, No. 12, pp. 1739-1755, 1993.
U.S. Appl. No. 12/792,498, filed Jun. 2, 2010.
U.S. Appl. No. 12/814,232, filed Jun. 11, 2010.
U.S. Appl. No. 12/814,272, filed Jun. 11, 2010.
Cula et al., "Bidirectional Imaging and Modeling of Skin Texture," Proceedings of Texture 2003, 6 pages, Oct. 17, 2003.
Cula et al., "Bidirectional Imaging and Modeling of Skin Texture," IEEE Transactions on Biomedical Engineering, vol. 51, No. 12, pp. 2148-2159, 2004.
Cula et al., "Compact Representation of Bidirectional Texture Functions," Proceedings of IEEE Computer Society Conference on Computer Vision and Pattern Recognition 2001, 8 pages, 2001.
Cula et al., "Skin Texture Modeling," International Journal of Computer Vision 2004, 34 pages, 2004.
Dabov et al., "Image Denoising by Sparse 3-D Transform-Domain Collaborative Filtering," IEEE Transactions on Image Processint, vol. 16, No. 8, pp. 2080-2095, Aug. 2007.
Dabov et al., "Image Restoration by Spars 3D Transform Collaborative Filtering," SPIE vol. 6812 681207-1, 12 pages, 2008.
Daugman, "High Confidence Visual Recognition of Persons by a Test of Statistical Independence," IEEE Transactions on Pattern Analysis and Machine Intelligence, vol. 15, No. 11, pp. 1148-1161, 1993.
Daugman, "Probing the Uniqueness and Randomness of Iris Codes: Results from 200 Billion Iris Pair Comparisons," Proceedings of the IEEE vol. 94, No. 11, pp. 1928-1935, Nov. 2006.
Fooprateepsiri et al., "A Highly Robust Method for Face Authentication," IEEE 2009 First Asian Conference on Intelligent Information and Database Systems, pp. 380-385, 2009.
Fooprateepsiri et al., "Face Verification Base-On Hausdorff-Shape Context," IEEE 2009 Asia Conference on Informatics in Control, Automation and Robotics, pp. 240-244, 2009.
Forstner et al., "A Metric for Covariance Matrices," 16 pages, prior to Jun. 11, 2010.
Gan et al., "Applications of Wavelet Packets Decomposition in Iris Recognition," LNCS vol. 3832, pp. 443-449, 2005.
Hampapur et al., "Smart Surveillance: Applications, Technologies and Implications," IEEE, 6 pages, Dec. 15-18, 2003.
Hamza et al., "Standoff Iris Recognition Usin Non-Iterative Polar Based Segmentation," Proceedings of SPIE vol. 6944, 8 pages, 2008.
Hanna et al., "A System for Non-Intrusive Human Iris Acquisition and Identification," IAPR Workshop on Machine Vision Applications, pp. 200-203, Nov. 12-14, 1996.
http://en.wikipedia.org/wiki/Radon_transform, "Radon Transform," 5 pages, printed May 14, 2010.
Ivins et al., "A Deformable Model of the Human Iris for Measuring Small Three-Dimensional Eye Movements," Machine Vision and Applications, vol. 11, pp. 42-51, 1998.
Kadyrov et al., "The Trace Transform and Its Applications," IEEE Transactions on Pattern Analysis and Machine Intelligence, vol. 23, No. 8, pp. 811-828, Aug. 2001.
Kadyrov et al., "The Trace Transform as a Tool to Invariant Feature Construction," 3 pages, prior to Jun. 11, 2010.
Kang et al., "Improved Dual Action Contour for Iris Recognition," 10 pages, prior to Jun. 11, 2010.
Kawaguchi et al., "Detection of Eyes from Human Faces by Hough Transform and Separability Filter," IEEE, 4 pages, 2000.
Kong et al., "Detecting Eyelash and Reflection for Accurate Iris Segmentation," International Journal of Pattern Recognition and Artificial Intelligence, vol. 17, No. 6, pp. 1025-1034, 2003.
Li et al., "Appearance Modeling Using a Geometric Transform," IEEE Transactions on Image Processing, 17 pages, 2008.
Li et al., "Appearance Modeling Using a Geometric Transform," Journal Preparation for IEEE Transactions on Image Processing, 30 pages, Nov. 5, 2006.
Ma et al., "Local Intensity Variation Analysis for Iris Recognition," Pattern Recognition, vol. 37, pp. 1287-1298, 2004.
Ma et al., "Video Sequence Querying Using Clustering of Objects' Appearance Models," Advances in Visual Computing Third Annual Symposium, ISVC 2007, 14 pages, 2007.

(56) References Cited

OTHER PUBLICATIONS

Monro et al., "DCT-Based Iris Recognition," IEEE Transactions on Pattern Analysis and Machine Intelligence, vol. 29, No. 4, Apr. 2007.
Noh et al., "A Novel Method to Extract Features for Iris Recognition System," AVBPA 2003, LNCS 2688, pp. 862-868, 2003.
Ojala et al., "Multiresolution Gray-Scale and Rotation Invariant Texture Classification with Local Binary Patterns," IEEE Transactions on Pattern Analysis and Machine Intelligence, vol. 24, No. 7, 18 pages, Jul. 2002.
Pamudurthy et al., "Dynamic Approach for Face Recognition Using Digital Image Skin Correlation," Audio and Video Based Person Authentication 5th International Conference, AVBPA 2005, Hilton Rye Town, NY, USA, 11 pages, Jul. 20-22, 2005.
Petrou et al., "The Trace Transform in a Nutshell," 9 pages, prior to Jun. 11, 2010.
Phillips et al., "FRVT 2006 and ICE 2006 Large-Scale Results," 56 pages, Mar. 2007.
Porikli et al., "Covariance Tracking Using Model Update Based on Means on Riemannian Manifolds," 8 pages, prior to Jun. 11, 2010.
Proenca et al., "Toward Noncooperative Iris Recognition: A Classification Approach Using Multiple Signatures," IEEE Transactions on Patern Analysis and Machine Intellingence, vol. 29, No. 4, pages. 607-612, Apr. 2007.
Ross et al., "Segmenting Non-Ideal Irises Using Geodesic Active Contours," IEEE 2006 Biometrics Symposium, 3 pages, 2006.
Shapiro et al., pp. 556-559 in Book Entitled "Computer Vision," Prentice Hall, prior to Jun. 11, 2010.
Stillman et al., "A System for Tracking and Recognizing Multiple People with Multiple Cameras," 6 pages, Aug. 1998.
Sun Et al., "Iris Recognition Based on Non-local Comparisons," Sinobiometrics 2004, LNCS 3338, pp. 67-77, 2004.
Suzaki et al., "A Horse Identification System Using Biometrics," Systems and Computer in Japan, vol. 32, No. 14, pp. 12-23, 2001.
Trucco et al., "Robust Iris Location in Close-up Images of the Eye," Pattern Anal. Applic. vol. 8, pp. 247-255, 2005.
Turan et al., "Trace Transform Based Invariant Object Recognition System," 4 pages, prior to Jun. 11, 2010.
Turk et al. "Eigenfaces for Recognition," Journal of Cognitive Neuroscience, vol. 3, No. 1, 16 pages, 1991.
Wang et al., "Recent Developments in Human Motion Analysis," Pattern Recognition, vol. 36, pp. 585-601, 2003.
Wei et al., "Robust and Fast Assessment of Iris Image Quality," LNCS vol. 3832, pp. 464-471, 2005.
Zhao et al., "Dynamic Texture Recognition Using Local Binary Patterns with an Application to Facial Expressions," IEEE Transactions on Pattern Analysis and Machine Intelligence, vol. 29, No. 6, pp. 915-928, Jun. 2007.
Zhi-Hui et al., "Research Iris Serial Images Quality Assessment Method Based on HVS," Proceedings of SPIE, vol. 6034, 6 pages, 2006.
U.S. Appl. No. 13/077,821, filed Mar. 30, 2011.
Freeboy, "Adaptive Optics Speeds Up Airport Immigration," Optics.org/ole, 2 pages, Jan. 2009.
http://www.imagine-eyes.com/content/view/100/115/, "INOVEO—Ultra-High Resolution Retinal Imaging with Adaptive Optics," 2 pages, printed Feb. 22, 2010.

* cited by examiner

BIOMETRIC VISITOR CHECK SYSTEM

BACKGROUND

The invention pertains security and particularly to controlled access or presence of individuals relative to an area or facility. More particularly, the invention pertains to use of biometrics to deny access or presence.

SUMMARY

The invention is a biometric exclusion and/or enrollment system. The biometric exclusion system uses biometric acquisition and matching and a database to screen a large population of subjects looking for members enrolled in a database. There may be two systems. An enrollment system may be used to enroll subjects into a database and a screening system may be used to match subjects against the database.

DESCRIPTION

There are many applications where a large population needs to be screened to keep out a small subset of individuals. In general, the objective is to prevent certain individuals from entering a facility but do it in a way that does not cause undo delay or hardship for the majority of the population that is permitted to enter. An example of this may be at a casino where a small list of individuals has been registered to be excluded from the facility. A system is needed to monitor all people coming into the facility to make sure that excluded individuals do not successfully enter.

The biometric exclusion system may use biometric feature (biometric) acquisition and matching, and a database to screen a large population of subjects by looking for members enrolled in a database. There may be two systems. An enrollment system may be used to enroll subjects into a database and a screening system may be used to match all subjects against the database.

Figure 1:
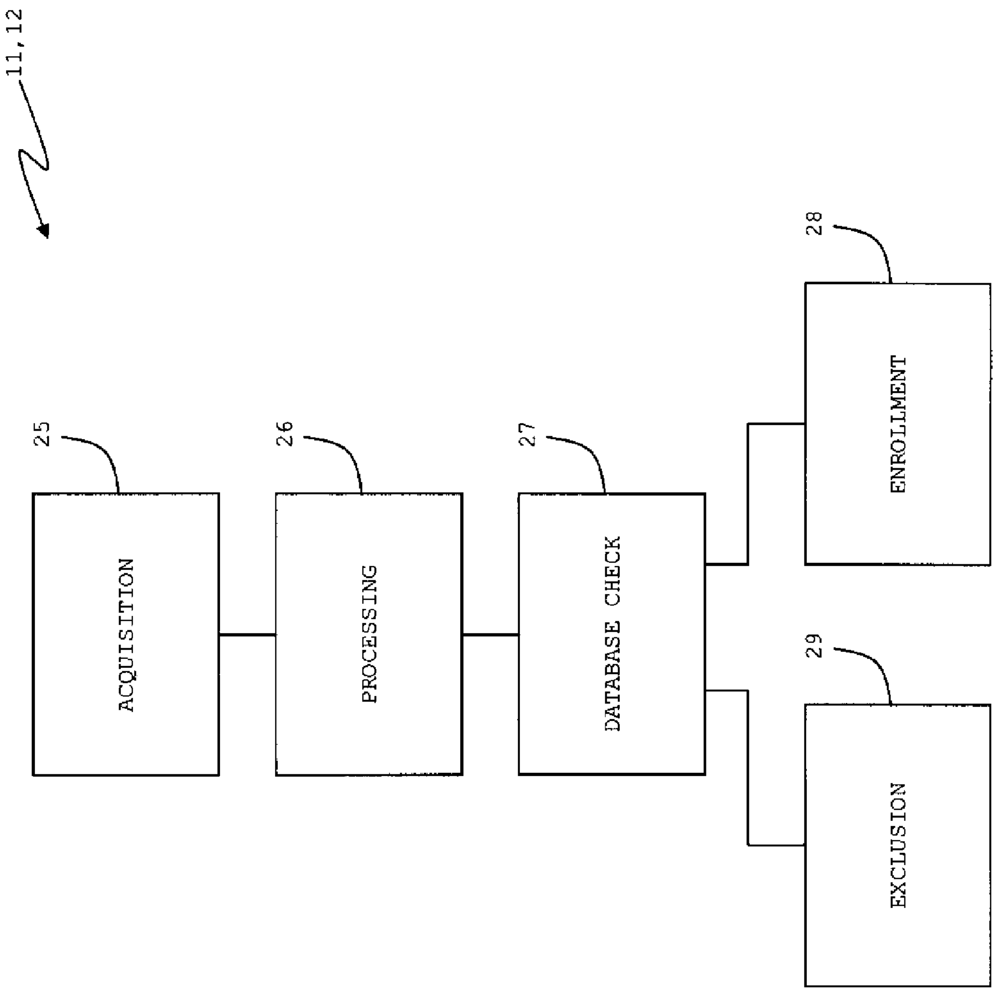
FIG. 1 is a diagram of an overall biometric visitor check system.

FIG. 1 is a diagram of the overall visitor check system 11, 12. The system may have an acquisition module 25, a processing module 26 connected to the acquisition module 25, a database check module 27 connected to the processing module 26, and an exclusion module 29 and an enrollment module 28 connected to the database check module 27. There may be other connections via the modules.

Figure 2:
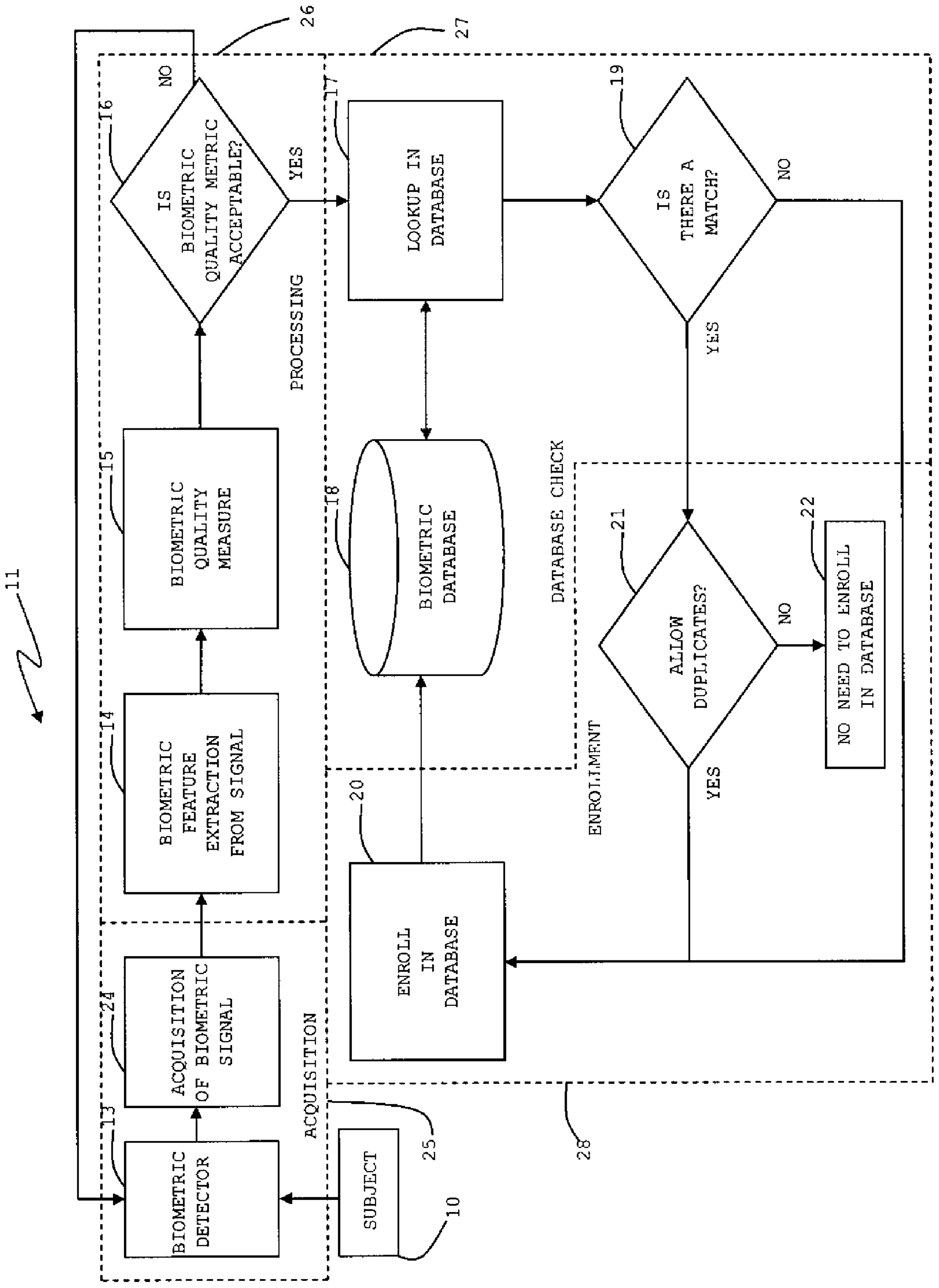
FIG. 2 is a diagram of a biometric-based enrollment system.

FIG. 2 shows a diagram of the components and flow of activity of the biometric-based enrollment system. In a first step, a subject may be detected. A biometric signal may be acquired from a subject 10. Then one or more biometric features (i.e., biometric) may be extracted from the signal. This system may use any of a number of biometrics including fingerprints, and face or iris for identification and/or recognition. The system may also use various combinations of biometrics. After the biometric has been extracted, a quality measure may be used to assess the quality of the biometric. If the biometric is not of sufficient quality, the acquisition process may start over and a new biometric signal can be acquired. If a new biometric is of good quality, a lookup may be done on the database to see if the biometric matches an existing record of the biometric in the database. If there is no match, the biometric may be enrolled in the database along with other biographical information such as the subject's name. If there is a database match on the biometric, the subject's biographical information or other information associated with the biometric may be displayed and the operator can be asked if the operator wants to append the new biometric to the existing biometric entry. If the operator says yes, then the biometric may be added or appended to the existing biometric entry in the database.

Figure 3:
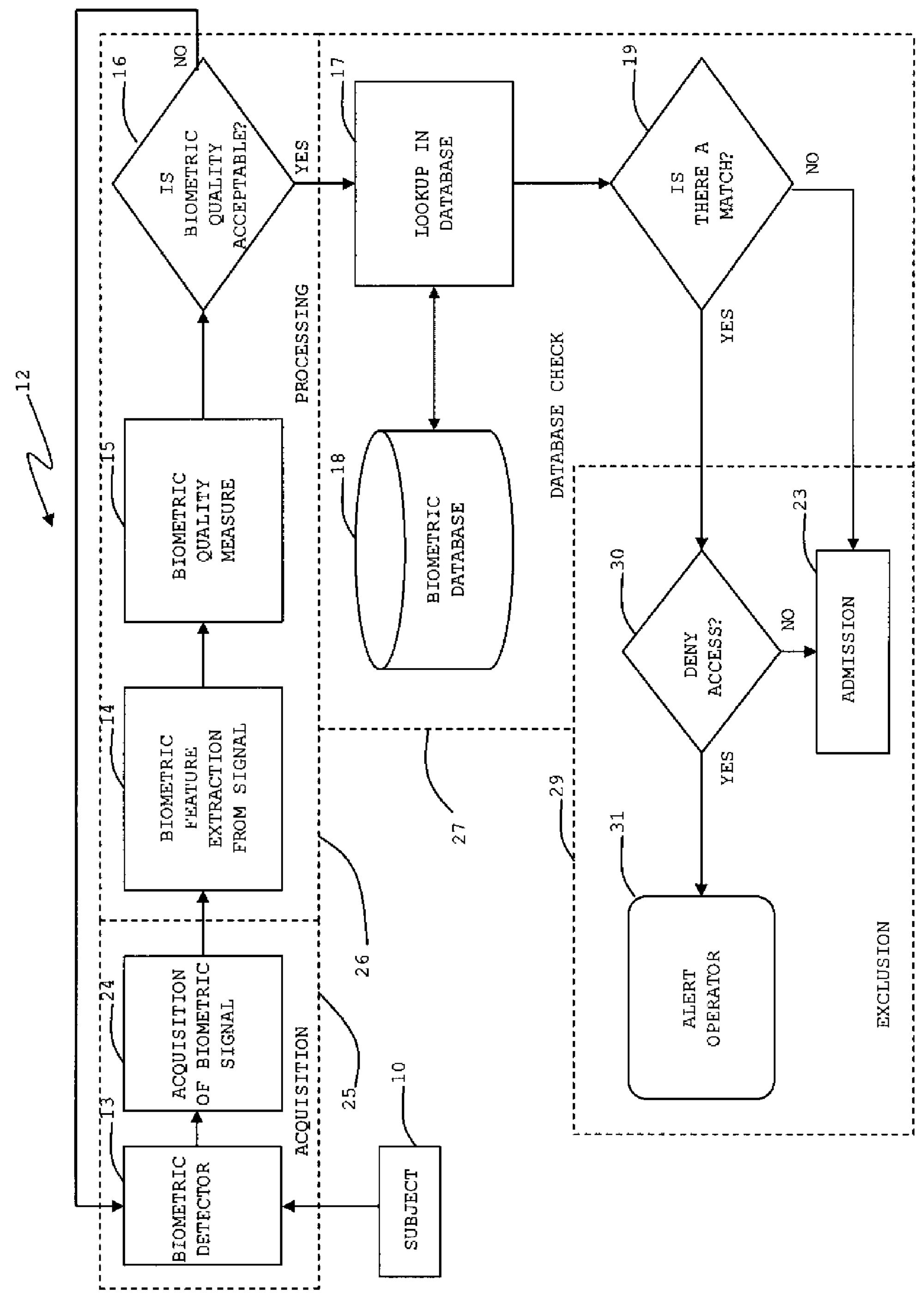
FIG. 3 is a diagram of a biometric-based exclusion system.

FIG. 3 shows a diagram of the components and flow of activity of the biometrics-based exclusion screening system. In the first step, a subject 10 may be detected. A biometric signal may be acquired from the subject. The biometric signal may include a fingerprint, face or iris. A system which does not require the cooperation or knowledge of the subject may acquire face or iris biometrics or both face and iris biometrics. If there are multiple subjects in the scene, the system could prioritize the subjects by giving higher priority to subjects from which the system has not yet acquired biometric signals. After acquisition of a biometric signal, one or more biometric features may be extracted from it. After biometric features (i.e., biometric) have been extracted, a quality measure may be used to assess the quality of the collected biometric features (biometric). If the biometric is not of sufficient quality, the system may acquire a new signal from the subject for biometric feature (biometric) extraction. If the biometric is of good quality, a lookup may be done on the biometric database to see if it matches an existing record in the database. If there is no match, the system may do nothing and go on to acquire a biometric signal from a newly detected subject, extract features (biometric), evaluate the biometric, and do a lookup of the biometric in the database if the biometric quality metric is acceptable.

If there is a database match on the biometric of the subject, then the subject may be denied access to the facility if the database match indicates that the subject is to be excluded, such as being on a list of individuals to be denied entry to a facility. This list may include volunteers requesting to be excluded because of perhaps wishing to break an addition of spending money at a casino. Exclusion of the subject would depend on whether the biographical information stored and associated with the subject's biometric features in the database indicate the subject to be undesirable for reasons of being, for example, one of those on the list to be excluded. If there are no compelling reasons for exclusion, the subject could still be admitted despite being listed in the database. Denying access may be done by activating a physical barrier such as a gate arm, or by alerting an operator at the facility. The system may alert an operator to the match, display the biographical information to the operator, and let the operator evaluate the biographical information in order to make a decision whether to admit the subject. When the system is reset by the operator, the system may loop back to detection and acquisition to check out a new subject.

The flow diagram of system 11 in FIG. 2 may be noted. A subject 10 may be detected at symbol 13. There may be an acquisition of a biometric signal from the subject at symbol 24. Items 13 and 24 may constitute an acquisition module 25. One or more biometric features (i.e., biometric) may be extracted from the signal at symbol 14. A biometric quality measure at symbol 15 may be applied to the biometric. At symbol 16, a question whether the quality measure or metric of the biometric is acceptable is asked. If the answer is no, then the detection at symbol 13 may be repeated followed by actions at symbols 24, 14, and 16, in that order. If an adequate acquisition of a biometric and a database search is not possible, then lookup of the biometric or enrollment of the subject in the database 18 is not feasible. The decision to enroll a biometric with an acceptable quality metric may be based on a policy or predetermined criteria. Items 14, 15 and 16 may constitute a processing module 26.

If the answer is yes to the question at symbol 16, then the biometric may be looked up at symbol 17 in a biometric database 18. At symbol 19, after a search of database 18, a question as to whether there is a match or not is asked. If the answer is no, then the biometric may be enrolled at symbol 20 in the biometric database 18. If the answer is yes to the question at symbol 19, then a question as to whether to allow duplicate biometric entries may be asked at symbol 21. If the answer is yes to the question, then the biometric may be enrolled symbol 20 as another one in biometric database 18. Some systems may allow duplicate entries to improve performance. If the answer is no at symbol 21, then symbol 22 may indicate that there is no need to enroll in the database 18. Items 17, 18 and 19 may constitute a database check module 27. An enrollment module 28 of system 11 may have items 20, 21 and 22.

The flow diagram of system 12 in FIG. 3 may be noted. Modules 25, 26 and 27 of system 12 are similar to modules 25, 26 and 27 of system 11. Detection may be applied to a subject 10 at symbol 13. A biometric signal may be acquired from the subject at symbol 24. One or more biometric features (i.e., a biometric) may be extracted from the biometric signal at symbol 14. A biometric quality measure at symbol 15 may be applied to the biometric from symbol 14. At symbol 16, a question of whether the biometric quality metric is acceptable is asked. If the answer is no, then a detection at symbol 13 may be repeated followed with the actions at symbols 24, 14, 15 and 16, in that order. If the answer is yes to the question at symbol 16, then the biometric may be looked up at symbol 17 in a biometric database 18. At symbol 19, a question whether there is a match of the biometric in database 18 may be asked. If the answer is yes, then access of the subject to a facility may be denied at symbol 30 if the match is on the denied list or if biographical information associated with the match indicates some other basis for denial. If there is a denial of the subject having that biometric, then in some cases an operator of the facility may be alerted at symbol 31. If the answer is no at symbol 19, then the subject may be admitted at symbol 23. If an adequate acquisition of a biometric and a database search is not possible, then a decision of whether to admit the subject to the facility may be made by an operator. The decision may be based on a facility policy or predetermined criteria. Items 23, 30 and 31 may constitute an exclusion module 29. Many of the modules noted in the present application may be implemented in electronic circuits and/or in software.

To recap, an approach for checking visitors may incorporate detecting a subject attempting to enter a facility, acquiring a biometric signal from the subject, extracting a biometric of the subject from the biometric signal, and performing a quality measure on the biometric to determine whether the quality of the biometric is sufficient for matching to another like biometric. If the quality measure of the biometric is acceptable, then a biometric, which matches the biometric of the subject, may be looked for in a biometric database to determine whether the subject can be admitted to the facility. Acquisition of a biometric from a subject and matching or comparing it with other biometrics may be performed in various ways. Some ways may be more direct than others.

If a biometric is found in the database, which matches the biometric of the subject, then the subject may be denied entry to the facility. Such facility may be a casino, a secured or restricted access compound, or the like. Access to the facility may be physically controlled by gates, guards, or other ways.

If a biometric, which matches the biometric of the subject, is not found in the database, then the subject may be admitted into the facility. Further, if the biometric, which matches the biometric of the subject, is not found in the database, the biometric of the subject may be enrolled in the database for one or more various purposes.

Since there may be an accommodation for storing in the database information pertinent to a person having a biometric listed in the database, the approach might further incorporate reviewing whether there is biographical information or other information associated with the biometric listed which matches the biometric of the subject, sufficient to support permitting entry by the subject into the facility despite having a biometric matching one listed in the database. The information could support or confirm a denial of entry.

The biometric of the subject may be enrolled in the database if there is a biometric in the database that matches the biometric of the subject and enrolling duplicate biometrics in the database is allowed. A decision whether to enroll the biometric of the subject in the database may be based on biographical information or other information associated with a biometric in the database that matches the biometric of the subject, or by an authorized decision or direction. An authority may be alerted if there is unusual or new information, or if additional action should be taken relative to the subject based on the biographical or other information.

The approach may incorporate detecting a subject attempting to enter a facility and acquiring a biometric from the subject without knowledge of the subject. The approach may instead or also incorporate detecting a subject attempting to enter a facility and acquiring a biometric from the subject without cooperation of the subject. The acquired biometric may be a face or an iris, or a combination of the face and the iris. It could be another kind of biometric. Various aspects of the present approach or system may occur without knowledge or cooperation of the subject.

In the present specification, some of the matter may be of a hypothetical or prophetic nature although stated in another manner or tense.

Although the present system has been described with respect to at least one illustrative example, many variations and modifications will become apparent to those skilled in the art upon reading the specification. It is therefore the intention that the appended claims be interpreted as broadly as possible in view of the prior art to include all such variations and modifications.

What is claimed is:

1. A method for checking visitors comprising:

detecting a subject attempting to enter a facility;

acquiring a biometric signal from the subject;

extracting a biometric of the subject from the biometric signal; and performing a quality measure on the biometric to determine whether the quality of the biometric is sufficient for matching to another like biometric; and wherein:

if the quality measure of the biometric is acceptable, then a biometric, which matches the biometric of the subject, is looked for in a biometric database to determine whether the subject can be admitted to the facility;

if a biometric is found in the database, which matches the biometric of the subject, then the subject is denied entry to the facility; and if the biometric, which matches the biometric of the subject, is not found in the database, then the biometric of the subject is enrolled in the database.

2. The method of claim 1, wherein the facility is a casino.

3. The method of claim 1, further comprising reviewing whether there is biographical information associated with the biometric, which matches the biometric of the subject, sufficient to support permitting entry by the subject into the facility.

4. The method of claim 1, further comprising enrolling the biometric of the subject in the database if there is a biometric in the database that matches the biometric of the subject and enrolling duplicate biometrics in the database is allowed.

5. The method of claim 1, further comprising deciding whether to enroll the biometric of the subject in the database based on biographical information associated with a biometric in the database that matches the biometric of the subject.

6. The method of claim 5, further comprising alerting an authority if additional action should be taken relative to the subject based on the biographical information.

7. The method of claim 1, wherein the biometric is a face or iris, or a combination of the face and the iris.

8. The method of claim 1, wherein detecting a subject attempting to enter a facility and acquiring a biometric signal from the subject occurs without knowledge of the subject.

9. The method of claim 1, wherein detecting a subject attempting to enter a facility and acquiring a biometric signal from the subject is occurs without cooperation of the subject.

10. The method of claim 1, wherein to determine whether the subject can be admitted to the facility comprises:

allowing access of the subject to the facility if there is no biometric, which matches the biometric of the subject, in the database; and denying access if there is a biometric, which matches the biometric of the subject, in the database that indicates a subject having such biometric should be denied access to the facility or allowed access if the matching biometric has associated biographical information indicating that the subject having such biometric can be admitted to the facility.

11. A system for screening persons wanting to enter a facility comprising:

a biometric acquisition mechanism for acquiring from a person a signal representing a biometric feature of a person;

a processor for processing the signal into a biometric of the person;

a search mechanism for searching a database for a biometric match for the biometric of the person; and an access control for a facility for denying or permitting entry of the person based on whether the search mechanism finds a biometric match for the biometric of the person, the access control comprising a decision maker for determining whether the subject should be denied access to a facility if there is any found biometric match for the biometric of the subject and a warning mechanism that alerts a person responsible for the facility if the subject should be denied access to the facility; and wherein:

a search mechanism for searching a database for a biometric match comprises:

a lookup device for finding biometrics in the database resembling the biometric of the subject; and a matcher for determining whether any of the found biometrics is a biometric match for the biometric of the subject;

the system further comprises an enroller for enrolling the biometric of the subject if the matcher indicates that there is no found biometric match for the biometric of the subject; and wherein the enroller can enroll the biometric of the subject if the matcher indicates that there is at least one found biometric match for the biometric of the subject, provided that enrollment of duplicates is permitted.

12. The system of claim 11, wherein the processor comprises:

an extractor for extracting the biometric feature from the signal;

a quality mechanism for measuring quality of the biometric feature;

an indicator for determining whether the quality of the biometric feature is sufficient for use in searching a database for a biometric match.

* * * * *